(12) United States Patent
Amir et al.

(10) Patent No.: US 8,277,658 B2
(45) Date of Patent: Oct. 2, 2012

(54) WASTEWATER TREATMENT

(75) Inventors: David Amir, Herzlia (IL); Eugene Rosenberg, Givat Shmuel (IL); Gili Bittan-Banin, Tel-Aviv (IL)

(73) Assignee: Biological Petroleum Cleaning Ltd., Petach-Tikva (IL)

( * ) Notice: Subject to any disclaimer, the term of this patent is extended or adjusted under 35 U.S.C. 154(b) by 0 days.

(21) Appl. No.: 13/274,373

(22) Filed: Oct. 17, 2011

(65) Prior Publication Data

US 2012/0031837 A1 Feb. 9, 2012

Related U.S. Application Data

(62) Division of application No. 12/155,811, filed on Jun. 10, 2008, now Pat. No. 8,038,881.

(60) Provisional application No. 60/929,070, filed on Jun. 12, 2007.

(51) Int. Cl.
*C02F 3/00* (2006.01)

(52) U.S. Cl. ........ 210/614; 210/620; 210/739; 210/800; 210/151; 210/220

(58) Field of Classification Search .............. 210/614, 210/620, 739, 800, 151, 220
See application file for complete search history.

(56) References Cited

U.S. PATENT DOCUMENTS

| | | | |
|---|---|---|---|
| 5,201,229 A | 4/1993 | Ibe | |
| 5,352,357 A | 10/1994 | Perry | |
| 5,552,051 A | 9/1996 | Wang et al. | |
| 5,585,001 A | 12/1996 | Jang et al. | |
| 5,770,059 A * | 6/1998 | Rhee | 210/170.08 |
| 5,882,932 A | 3/1999 | Yoon et al. | |
| 5,989,428 A | 11/1999 | Goronszy | |
| 6,153,099 A | 11/2000 | Weis et al. | |
| 6,916,427 B2 | 7/2005 | Roth | |
| 7,097,762 B1 | 8/2006 | Ruocco et al. | |
| 7,153,429 B1 * | 12/2006 | Pedros | 210/610 |
| 7,172,687 B2 * | 2/2007 | Webb | 210/96.1 |
| 7,276,165 B2 | 10/2007 | Morgoun | |
| 7,314,563 B2 | 1/2008 | Cho et al. | |
| 7,628,918 B2 | 12/2009 | Bovaird | |
| 2006/0019333 A1 | 1/2006 | Rodgers et al. | |
| 2006/0138047 A1 | 6/2006 | Morgoun | |
| 2008/0047903 A1 | 2/2008 | Morse | |
| 2008/0308493 A1 | 12/2008 | Amir et al. | |

FOREIGN PATENT DOCUMENTS

| | | |
|---|---|---|
| DE | 10009251 | 9/2001 |
| EP | 2006254 | 12/2008 |
| GB | 1551140 | 8/1979 |
| JP | 55-097290 | 7/1980 |
| WO | WO 2007/038843 | 4/2007 |

OTHER PUBLICATIONS

Communication Pursuant to Article 94(3) EPC Dated Jun. 1, 2010 From the European Patent Office Re. Application No. 08252000.8.

(Continued)

*Primary Examiner* — Chester Barry

(57) ABSTRACT

A system and method for treating wastewater by continuously flowing wastewater into a chemostat and continuously discharging clean water out of the chemostat. The system can include sensors and an electronic controller for on-line measuring ambient parameters in the chemostat and adjusting the chemostat's operating conditions accordingly.

12 Claims, 12 Drawing Sheets

OTHER PUBLICATIONS

European Search Report and the Written Opinion Dated Sep. 26, 2008 From the European Patent Office Re.: Application No. 08252000.8.
Notice of Allowance Dated Jun. 17, 2011 From the US Patent and Trademark Office Re. U.S. Appl. No. 12/155,811.
Official Action Dated Dec. 22, 2010 From the US Patent and Trademark Office Re. U.S. Appl. No. 12/155,811.
Official Action Dated Sep. 29, 2010 From the US Patent and Trademark Office Re. U.S. Appl. No. 12/155,811.
Response Dated Nov. 10, 2009 to Communication Pursuant to Article 94(3) EPC of Jul. 14, 2009 From the European Patent Office Re.: U.S. Appl. No. 08252000.8.
Response Dated Oct. 20, 2010 to Official Action of Sep. 29, 2010 From the US Patent and Trademark Office Re. U.S. Appl. No. 12/155,811.
Response Dated Sep. 20, 2010 to Communication Pursuant to Article 94(3) EPC of Jun. 1, 2010 From the European Patent Office Re. Application No. 08252000.8.
Response Dated May 23, 2011 to Official Action of Dec. 22, 2010 From the US Patent and Trademark Office Re. U.S. Appl. No. 12/155,811.
Communication Pursuant to Article 94(3) EPC Dated Oct. 18, 2011 From the European Patent Office Re. Application No. 08252000.8.

* cited by examiner

US 8,277,658 B2

WASTEWATER TREATMENT

RELATED APPLICATIONS

This application is a divisional of U.S. patent application Ser. No. 12/155,811 filed on Jun. 10, 2008, now U.S. Pat. No. 8,038,881, which claims the benefit of priority of U.S. Provisional Patent Application No. 60/929,070 filed on Jun. 12, 2007. The contents of all of the above applications are incorporated by reference as if fully set forth herein.

FIELD OF THE INVENTION

This invention relates generally to industrial wastewater treatment and more specifically to a system and method for controlled wastewater treatment using a chemostat.

BACKGROUND OF THE INVENTION

Industrial wastewater is produced as a by-product of industrial processes, for example, processes in oil refineries and petrochemical plants.

Wastewater from refineries may be highly contaminated given the number of sources it can come into contact with during the refinery process. This contaminated water may, for example, be process wastewater from desalting, water from cooling towers, storm water, distillation, or cracking. This water can be recycled through many stages during the refining process and typically goes through several treatment processes, including wastewater treatment, before being released into surface water.

Existing technologies for the treatment of contaminated water in oil refineries and petrochemical plants consist of a series of sequential steps, including the steps shown in the flow diagram of FIG. 1.

To-date, the majority of the wastewater treatment is done by using the "activated sludge" (depicted in the flow diagram of FIG. 2) or "membrane bioreactors" ("MBR") (depicted in the flow diagram of FIG. 3) technologies. In general, in activated sludge plants, atmospheric air or pure oxygen is bubbled through wastewater combined with organisms, to develop a biological floc which reduces the organic content of the wastewater. In all activated sludge plants, once the industrial wastewater has received sufficient treatment, an additional step of settling out the biological floc is required. Part of the settled material, the sludge, is returned to the system to re-seed the new industrial wastewater entering the tank. The remaining sludge then needs to be disposed of. The MBR technology combines the use of an activated sludge bioreactor with a cross flow membrane filtration loop. The membrane is used for the additional step of biological floc removal, by filtration, and as a result recycled and waste sludge are produced.

U.S. Pat. No. 6,916,427 to Roth discloses a method of purifying wastewater, including running the wastewater as a fluent into a headworks where some preliminary treatment takes place, passing the fluent into a primary reservoir where it is analyzed as to certain control parameters such as pH, dissolved oxygen and/or dissolved solids. Thereafter the fluent flows into a primary reactor having a plurality of electrolytic cells therein. While in that reactor the fluent is subjected to electrical contacts which are located at the bottom and the top of the reactor. The effluent from the primary reactor passes through a ratio weir into a secondary receptor containing sensors for the measurement of control parameters such as pH, DO, TDS and chlorine. Thereafter, the fluent is passed to a filtering device.

U.S. Pat. No. 5,989,428 to Goronszy provides a method and apparatus for treating waste material to remove selected components form the waste is described using a reactor or a series of reactors in fluid communication with each other for receiving the waste to be treated as influent. The influent forms a biomass including the waste and microorganisms and is treated by controlling the metabolic activity of the microorganisms by monitoring the oxygen utilization rate or the potential oxygen utilization rate of the biomass so as to determine the required amount of oxygen to be supplied to the biomass and to determine the period of aeration of the biomass in order to maintain a predetermined oxygen utilization rate or value so as to remove the selected components of the waste. The preferred selected components to be removed are nitrogenous, carbonaceous and/or biological phosphorus containing materials or derivatives.

US Published Patent Application No. 20080047903 to Morse discloses a system and process for optimizing chemical additions, mixing energy, mixing time, and other variables while treating a contaminated liquid stream. Samples from the contaminated liquid stream are tested to determine the optimal parameter for each variable, including type and amount of the chemicals to be added, chemical sequence, mixing energy, mixing time, temperature, and pressurization. A system of mixers, a flotation chamber, and a dewatering subsystem are designed to achieve optimal turbidity of the wastewater stream. The system can be modified in real-time in response to a continually changing contaminated liquid stream via a controller and set of sensors, valves, and ports. The process takes place during the pre-treatment stage. There is need for a stable, efficient, continuous and cost-effective wastewater treatment process to overcome the shortcomings of existing processes.

SUMMARY OF THE INVENTION

Disadvantages of existing wastewater treatment processes have been found to include:

1. An additional step of biological floc removal by sedimentation or filtration is required, since the TSS (total suspended solids) in the effluent of these processes is about 2,000 ppm in the activated sludge bioreactor and about 4,000 ppm in the MBR bioreactor, thus much higher than the usually required 1-50 ppm.
2. Waste sludge is produced and needs to be disposed of.
3. Sludge is recycled to the process and as a result, the biological process is done in a very high cell density (bacterial concentration), which may lead to reduction in the carbon and nitrogen consumption. In activated sludge and MBR the retention time of a bacterium in the bioreactor is days-weeks During a biological treatment bacteria consume the carbon source (e.g. oil) and convert it to: $CO_2$ and material for cell growth (more bacteria). Therefore, to get efficient carbon degradation, bacteria should be in the log phase which is marked by rapid exponential growth (more new bacteria produced).

The log phase of bacterial growth is followed by the stationary phase, in which the size of a population of bacteria remains constant and metabolic activity is drastically reduced. If incubation continues after the population reaches the stationary phase, a death phase follows, in which the viable cell population declines.

Recognizing the basic bacterial growth cycle clearly suggests that working at high cell densities, as routinely carried out in "activated sludge" and "MBR," may lead bacteria to a stationary phase. To summarize, working in a high cell density leads to a decrease in metabolic activity and eventually to a decline in the viable cell population and, therefore, to a decrease in carbon and nitrogen consumption. FIG. 4 illustrates a graph depicting the bacterial growth cycle described above.

"Activated Sludge" and "MBR" are complicated processes, with multiple steps and high maintenance requirements. For example, in the "MBR" process membrane fouling is the most serious problem affecting system performance. Frequent membrane cleaning and replacement is therefore required, significantly increasing the operating costs. Different types of chemical cleaning are recommended: chemically enhanced backwash (daily); maintenance cleaning with higher chemical concentration (weekly); intensive chemical cleaning (once or twice a year).

Described herein are systems and methods for treating wastewater by continuously flowing wastewater into a chemostat and continuously discharging clean water out of the chemostat. The described methods alleviate many of the disadvantages associated with prior art water treatment systems.

One embodiment is a wastewater treatment system including a chemostat including a wastewater input, a clean water output, a bacteria input, a nutrients input, an oxygen input and sensors for measuring ambient parameters. The system also includes an electronic controller connected with the sensors, the controller configured to receive measurements from the sensors and control operating conditions of the chemostat accordingly. The electronic controller is configured to maintain a low enough concentration of bacteria within the chemostat to be discharged to the nature without further treatment.

The controller may control at least one of the waste water input, the nutrients input, and the oxygen input. The system may be configured so that no sludge is recycled in the system. The controller may be configured to adjust carbon concentration (by changing the influent flow rate) to the carbon degradation potential of the bacteria as measured, e.g. by DO.

The measured parameters may include flow rate, (Dissolved Oxygen) DO, (Oxygen Uptake Rate) OUR, pH, temperature, nutrients, contamination level, turbidity and conductivity. A retention time of the bacteria in the chemostat may be 5-50 hours. The system may further include an alert.

The system may include an automatic starting system for starting system operation. The automatic starting system may be configured to restart a system operation by building a first biomass in the chemostat and operating the chemostat in a continuous flow mode following the building of the first biomass.

The system may be configured to test water discharged from the clean water output. The system may further include a gravity separation device connected between the wastewater input and the chemostat, for performing a pre-treatment step of oil-water separation. The system may further include a chemical/mechanical separation unit connected between the wastewater input and the chemostat. The system may further include a chemical/mechanical separation unit connected between the gravity separation device and the chemostat.

The system may further include a first continuous flow chemostat and a second continuous flow chemostat downstream the first chemostat. The first and the second chemostats may operate at different flow rates.

Another embodiment is a method of treating wastewater. The method may include continuously flowing wastewater into a chemostat and continuously discharging clean water out of the chemostat, on-line measuring ambient parameters in the chemostat, and adjusting operating conditions in the chemostat accordingly. The operating conditions are adjusted to maintain a low enough concentration of bacteria within the chemostat to be discharged to the nature without further treatment.

Yet another embodiment is a wastewater treatment system. The system includes a wastewater input, a bacteria and nutrients input, an oxygen input, and a clean water output. The system is configured to maintain the TSS (total suspended solids) in the bio-reactor lower than the TSS in the wastewater input. Another embodiment is a wastewater treatment system including a chemostat including a wastewater input, a clean water output, a bacteria input, a nutrients input, an oxygen input and sensors for measuring ambient parameters. The system also includes an electronic controller connected with the sensors, the controller configured to receive measurements from the sensors and control the operating conditions of the chemostat accordingly. The system further includes a post-processor connected with the clean water output, the post-processor configured to filter residues out of the discharged water. The post-processor may include a membrane.

Another embodiment is a wastewater treatment system including a chemostat comprising a wastewater input, a clean water output, a bacteria input, a nutrients input, an oxygen input and sensors for measuring ambient parameters. The system further includes a post-processor connected with the clean water output, the post-processor configured to filter residues out of the discharged water.

BRIEF DESCRIPTION OF THE DRAWINGS

For a better understanding of the invention and to show how the same may be carried into effect, reference will now be made, purely by way of example, to the accompanying drawings.

DETAILED DESCRIPTION OF THE INVENTION

Figure 1:
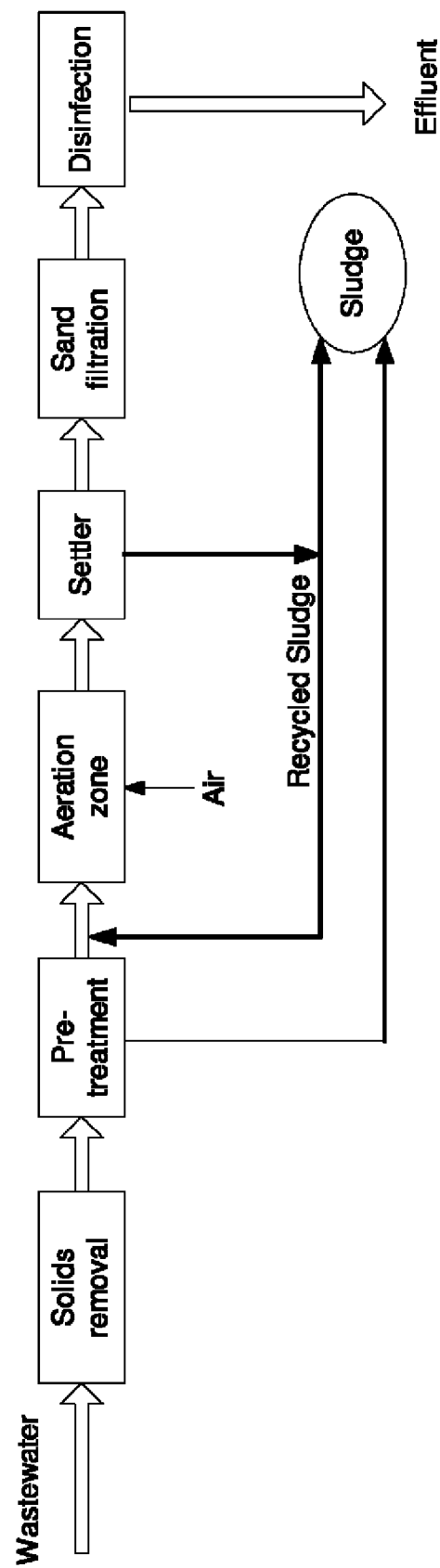
FIG. 1 is a flow diagram showing the sequential steps for the treatment of contaminated water in oil refineries and petrochemical plants according to the prior art.
Figure 2:
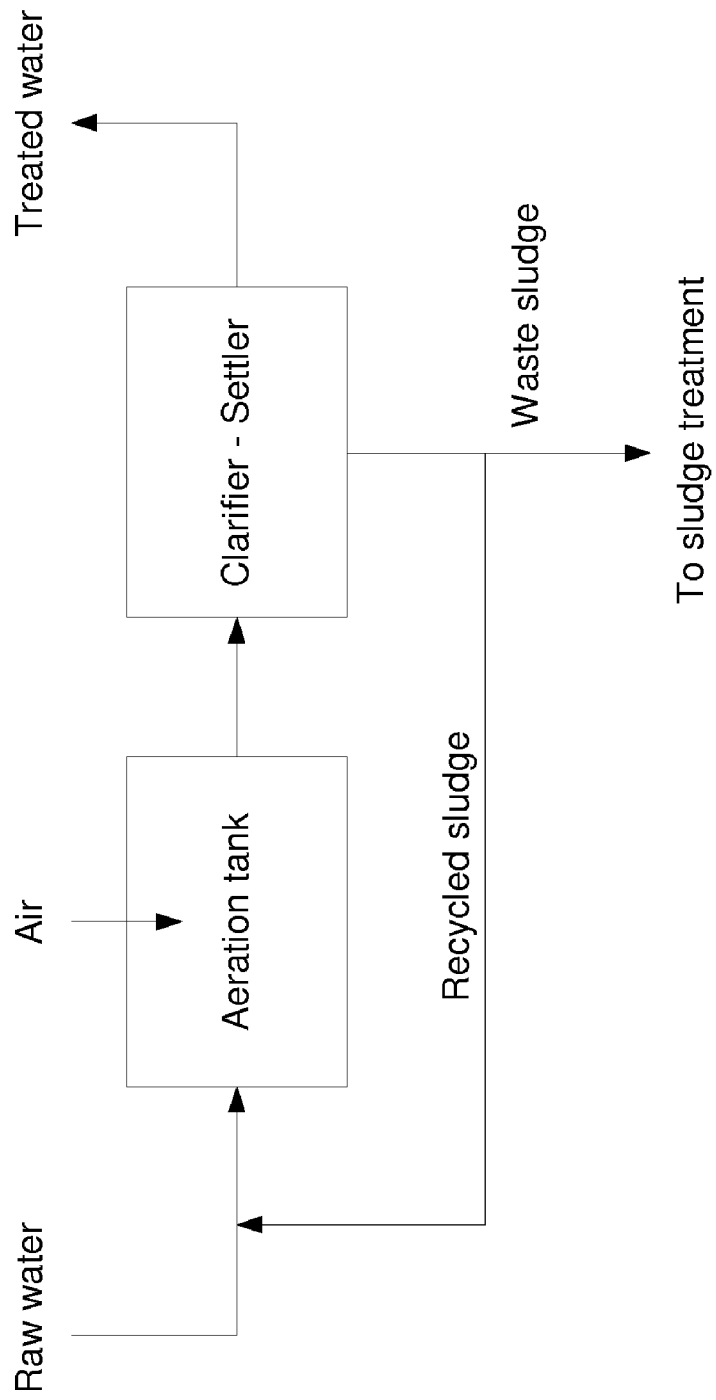
FIG. 2 is a flow diagram of an "activated sludge" process for wastewater treatment according to the prior art.
Figure 3:
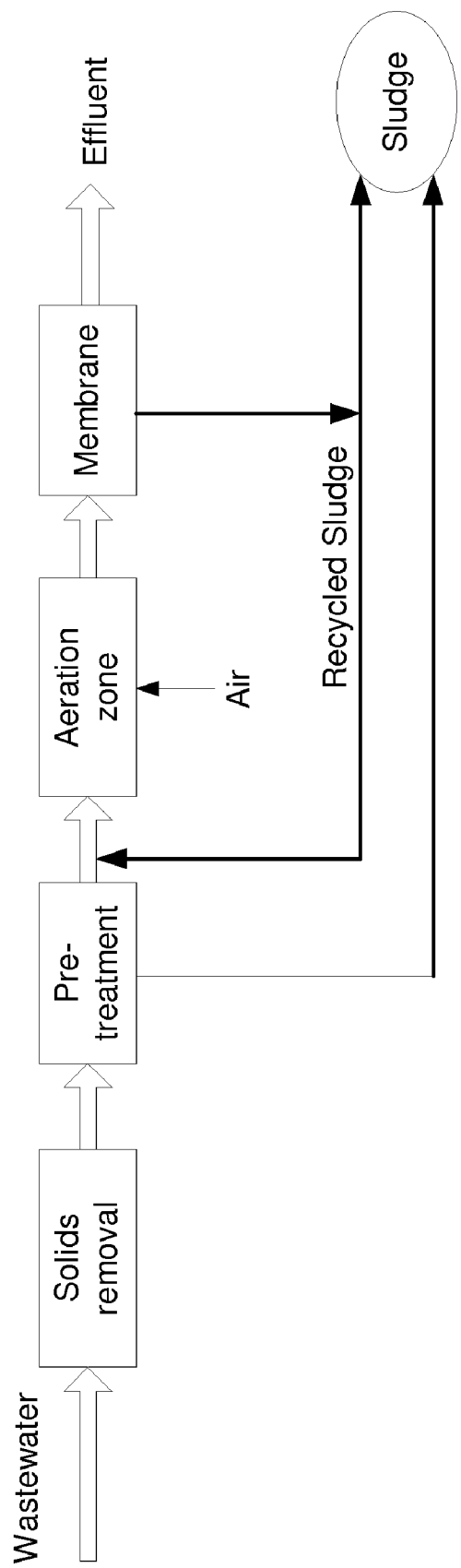
FIG. 3 is a flow diagram of a "membrane bioreactors" ("MBR") process for wastewater treatment according to the prior art.
Figure 4:
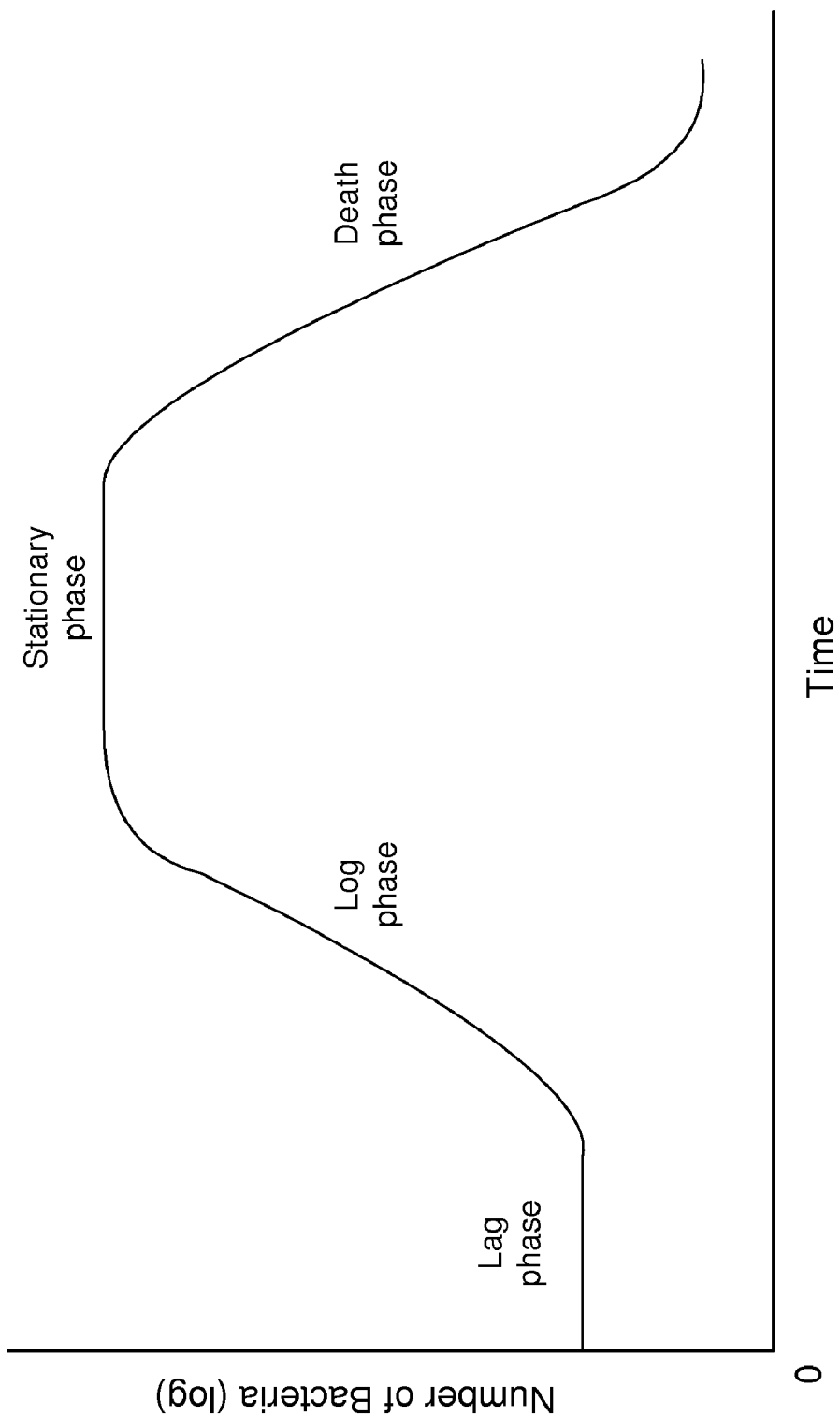
FIG. 4 is a graph depicting an example of a bacterial growth cycle.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the invention. It is important, therefore, that the claims be regarded as including such equivalent constructions insofar as they do not depart from the spirit and scope of the invention. For a better understanding of the invention, its operating advantages and the specific objects attained by its uses, reference should be made to the accompanying drawings and descriptive matter which illustrate exemplary embodiments of the invention. In order to overcome the disadvantages of the existing wastewater cleaning processes ("Activated Sludge" and "MBR"), the invention provides a new process, using a combination of three components:

1. Continuous culture reactor, also called a chemostat, where bio-sludge is not recycled into the reacor;
2. A dedicated control system that follows all parameters in the effluent inlet and outlet and adjusts the process accordingly;
3. Non-aggregate bacteria culture that maximizes the active surface of bacteria for bio-degradation.

Figure 5:
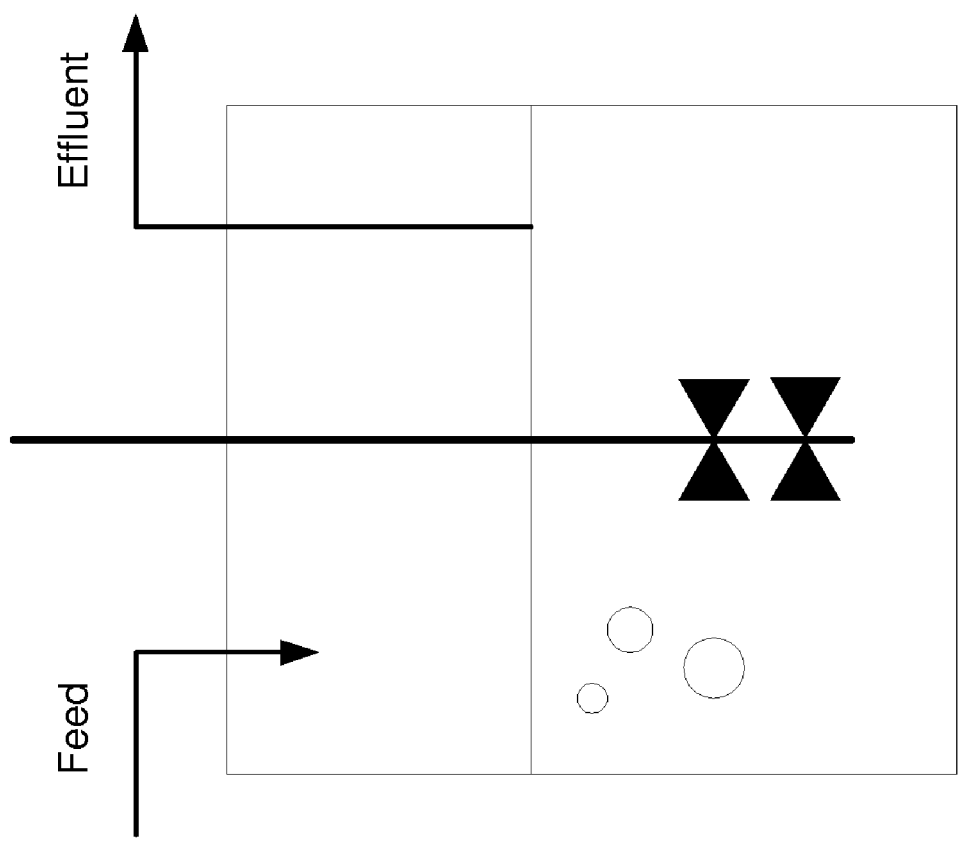
FIG. 5 illustrates an exemplary stirred bioreactor operated as a chemostat, with a continuous inflow (the feed) and outflow (the effluent)

Chemostat—A chemostat is a bioreactor to which fresh medium is continuously added, while culture liquid is continuously removed to keep the culture volume constant. FIG. 5 is a schematic drawing of a stirred bioreactor operated as a chemostat, with a continuous inflow (the feed) and outflow (the effluent). The inflow is controlled to keep the culture volume constant.

By changing the rate with which the medium (carbon source) is added to the chemostat, the growth rate of the microorganism can be easily controlled. If carbon concentration in the chemostat is increased the bacterial concentration is increased to a point of steady state. Thus, the carbon concentration determines the bacterial concentration. For example:

TPH=147 ppm, bacterial concentration is $1*10^7$ cells/ml.

When TPH increase to 210 ppm, the bacterial concentration is increased to $2*10^7$ cells/ml.

(TPH—total petroleum hydrocarbons is a portion of the TOC)

The System of the Present Invention is Configured to Adjust Carbon Concentration (by changing the influent flow rate) to the carbon degradation potential of the bacteria as measured, e.g. by DO. Thus, the bacterial concentration can be adjusted to utilize the variable carbon and nitrogen sources efficiently, Avoiding the use of excess concentration (Overkill—as done in Activated Sludge and MBR) allows the process to work at a point where bacterial concentration is high enough to degrade a given carbon source and low enough to create low turbidity and TSS (Total Suspended Solids).

The TSS measured in the effluent from the chemostat may be less than the typically required 50 ppm for discharging into nature. The system is configured to maintain the TSS (total suspended solids) in the bio-reactor lower than the TSS in the wastewater input. Thanks to the low concentration of bacterial cells, no aggregates are formed, and each bacterium acts as a single cell which increases the surface available for the process and enables biodegradation at a much higher efficiency.

Working at this point has two advantages:
1) Avoiding entrance to the phase where metabolic activity and viability is decreased, thus creating a very efficient carbon/nitrogen degradation process. According to one embodiment, the system operates at 5%-10% flow (5% flow means that in a 2 liters reactor 0.1 liters per hour are flowing in and out of the reactor. 10% flow means that in a 2 liter reactor 0.2 liters per hour are flowing in and out of the reactor). This means that the retention time of the bacteria in the chemostat may be 10-20 hours, during this time the bacteria multiply before they are washed out in order to keep their concentration in the chemostat constant.
2) Enabling the discharge of treated water back to nature without the additional steps of sludge sedimentation and/or filtration.

The chemostat according to the invention may operate as a continuous flow reactor without using activated sludge. The chemostat can thus be applied on site while using available infrastructure with high flexibility for modulation of the process.

Automatically Controlled System

In order to utilize a carbon source (e.g. oil) bacteria also typically utilize other nutrients, and a defined range of physical conditions such as $O_2$ concentration, temperature, and pH. However, in-let wastewater (e.g. refinery waste water) typically includes variations in the carbon concentration, temperature, and salinity. Bacteria can adjust gradually to mild variations but not to extreme ones. The latter leads to instability, reduction in the treatment efficiency and even to a fall and dying of the biological treatment. Therefore, maintaining stability is useful for a successful bio-treatment.

A chemostat is a very efficient tool if variations in the in-let of a wastewater are done gradually. However, to deal with extreme variations, the system may include a control system that stabilizes the biological process and enables working under optimized conditions.

Figure 6:
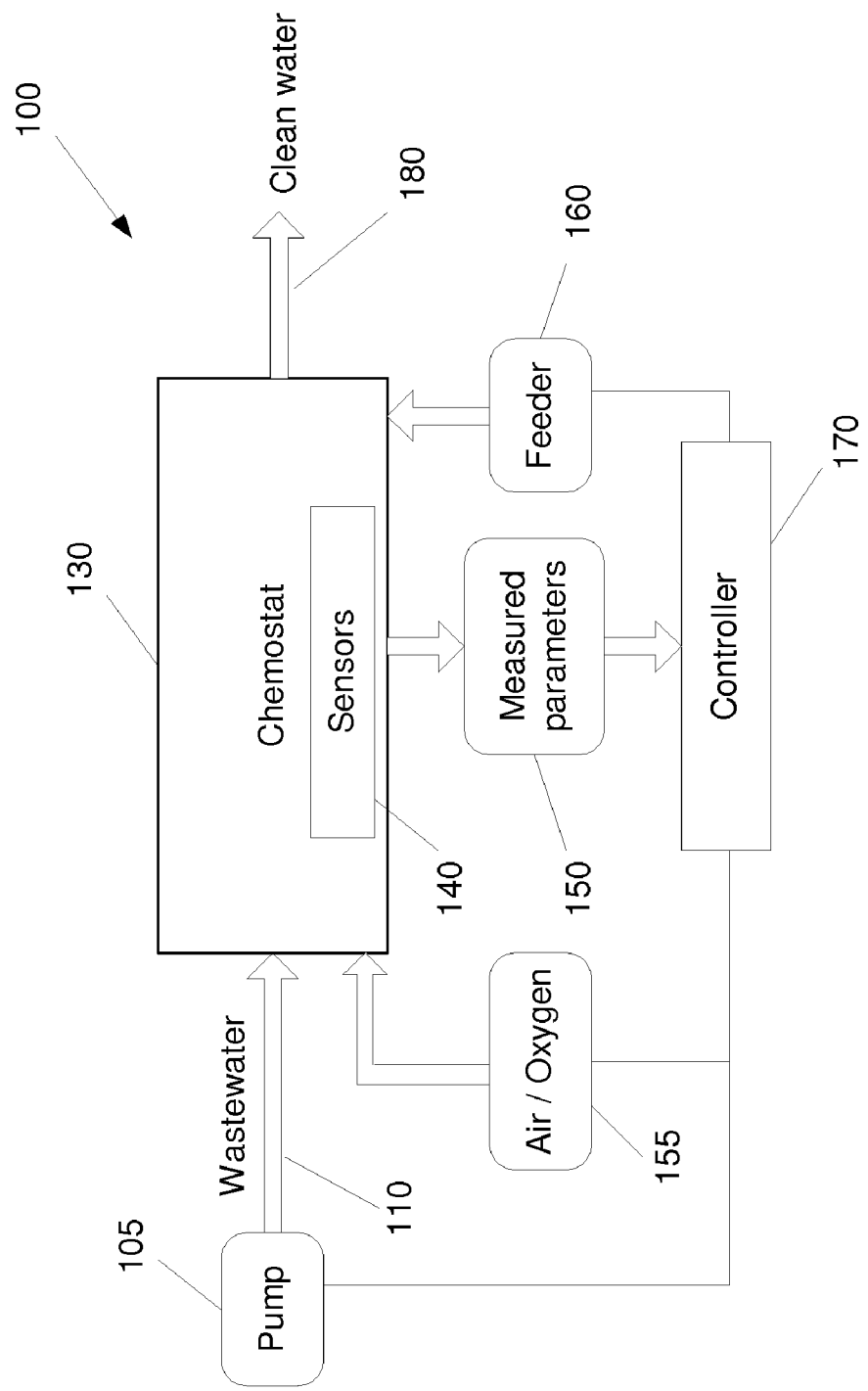
FIG. 6 illustrates an exemplary wastewater treatment system according to a first embodiment of the invention.

FIG. 6 is a schematic drawing of a wastewater treatment system (100) according to a first embodiment of the invention, including a chemostat (130), online sensors (140), an electronic controller (170) running control software for online analysis of sensor measurements and real time process modifications. Controller (170) is connected with a wastewater inlet pump (105) and nutrients feeder (160) and air/oxygen supply (155).

Wastewater (110) is input into the Bio-reactor (130) that automatically and efficiently purifies the water using bio-degradation. Should there be a change in parameters (temperature, pH, etc.) the Bio-reactor's sensors (140) communicate (150) with the controller (170) to automatically stabilize the flow as described above, by controlling the incoming flow rate and/or the nutrients feeding into the chemostat and/or the oxygen level. This ensures that a balanced state is continuously maintained. The controller may also communicate an alert, such as alert a cell phone on-line and/or the relevant authorities when at least one of the measured parameters is out of tolerance. The virtually sludge-free purified water (180) can be re used or released into the nature.

The on line sensors (140) are used to measure and feed the control unit information on multiple parameters such as TPH, nitrogen, dissolved oxygen, TOC and temperature (listed in table 1 below), anticipate inlet fluctuations in conjunction with the controller that has been specifically designed for predefined flow rates and identify contamination type as well as level of contamination. This is useful in order to be accurate with important parameters (such as TPH, Ammonia, etc.). A few exemplary sensors may be: BioTecor, a TOC analyzer available from Pollution Control Systems Inc, Milford, Ohio, USA, Opti-DO model 2000, a DO sensor available from Insite IG, Slidell, La., USA and Solitax-t, and a turbidity sensor available from Hach-Lange, Dusseldorf, Germany.

TABLE 1

Measured Parameters

| Parameter to measure | In-let | Out-let/ (Bio. Treatment) |
|---|---|---|
| Flow | ✓ | |
| DO | | ✓ |
| OUR | | ✓ |
| pH | ✓ | ✓ |
| Temp | ✓ | ✓ |
| Nutrients (e.g. ammonia) | | ✓ |
| Contamination level (TPH/TOC) | ✓ | ✓ |
| Turbidity | ✓ | ✓ |
| Conductivity | ✓ | ✓ |

Measuring these parameters or part thereof may be used to define the conditions in the reactor in real time and allow automatic modifications in the process (in terms of flow rate, nutrients/additives, temperature, air/oxygen etc.) that will increase its stability and the process efficiency. The controller continuously maintains an optimum process balance between the flow rate, bacterial growth, additives and organic compound degradation.

EXAMPLE 1

Flow Control

One of the main problems in wastewater treatment is extreme changes in the quality of the in-let water. The system of the invention can overcome this problem by adjusting the flow rate in relation to the quality of the in-let water. Measuring multiple parameters linked with the controller enables the system to distinguish between different statuses and respond according automatically. For example, if the contamination is extremely increased (peak), the on line contamination level analyzer (TPH/TOC) will "report" it to the controller and the flow rate will may be automatically decreased or temporarily switched to batch mode, namely zero flow if necessary, to allow bacteria to adjust to the new conditions.

Moreover, since oxygen and carbon consumption are coupled, the DO (Dissolved Oxygen) level can also be used as a useful indicator to the contamination (carbon) level. Decrease in the DO level may result from increase in the carbon concentration.

EXAMPLE 2

Nutrients

In order to utilize carbon, bacteria typically utilize inorganic nutrients. Therefore, it is important, on the one hand, that nutrients will not be a limiting factor. However, on the other hand, there is a limitation on nitrogen/phosphate disposal, so excess of these nutrients is not desired. By measuring nutrients concentrations on line, (directly or indirectly, e.g. DO), an automatic nutrients adjustment can be done accurately.

EXAMPLE 3

Temperature

If the inlet temperature is measured to be higher than the optimized temperature in the chemostat, a decrease in the flow rate may achieve a "dilution effect" of the temperature.

Under certain predefined condition the system may issue alerts and if necessary automatically stop its operation (e.g. flow=0) to avoid catastrophe.

For example, in the current conventional wastewater treatment methods ("activated sludge" and "MBR"), if a bacteriocide (a substance that kills bacteria) is introduced to the reactor, it leads to process death and the process has to be restarted from the beginning (time and money consuming).

In a process, integration of the on line DO measurement+ contamination level measurement may serve as an alarm in case where a toxic compound is introduced to the chemostat. In other words, while there is a coupling between the contamination level (measured by TOC/TPH) and the oxygen (measured by DO) consumption, in the presence of toxic material the DO is decreased even if the contamination level is not changed.

In addition, there may be a correlation between conductivity and some toxic salts concentration. For example, if the wastewater contains a peak of zinc, which is accompanied by chloride (its anion), the peak may be detected by a rise in conductivity. If the on line conductivity analyzer in the in-let 'senses' and 'reports' to the control system that conductivity is increased to a higher ratio than the 'allowed', the control system will stop the in-let flow to the system to avoid process death. The controller according to the invention can identify conditions under which the process may be restarted, e.g. when the biological process is "dead", possibly due to some unidentified toxin entering the system. In this case, a certain volume, which is automatically refreshed by the system, is used as a starter to build a new biomass. Using the control system, the reactor may be refilled in a fed-batch mode (semi-continuous mode), whereby the chemostat is gradually filled at an automatically determined rate and the biodegrading process begins. Only when the chemostat has been filled will the continuous process start. This method can enable restoring the process in less than 24 hrs. The same may also be used to build the first biomass before the continuous process takes place, or if the process was stopped from any reason. Alternatively, the restoring process may be conducted in a batch mode, wherein the biodegrading process only starts once the chemostat has been filled and biological conditions have stabilized.

The control system may additionally be used to inspect, on line, the treated water quality and, if necessary, automatically stop discharging to the nature. If, despite the aforesaid, the carbon degradation is inefficient, it is possible that the contamination source was changed and new bacteria needs to be enriched, e.g. Acinetobacter or Bacillus for degrading alkanes, Pseudomonas or Sphingomonas for degrading aromatic hydrocarbons and phenols. The system can identify this occurrence, e.g. by verifying that the multiple parameters are within the normal ranges yet no carbon utilization occurs, and new bacterial enrichment may be suggested. This can be a periodical service (based on the control system alerts) that is given to the customer by the system provider.

Figure 7:
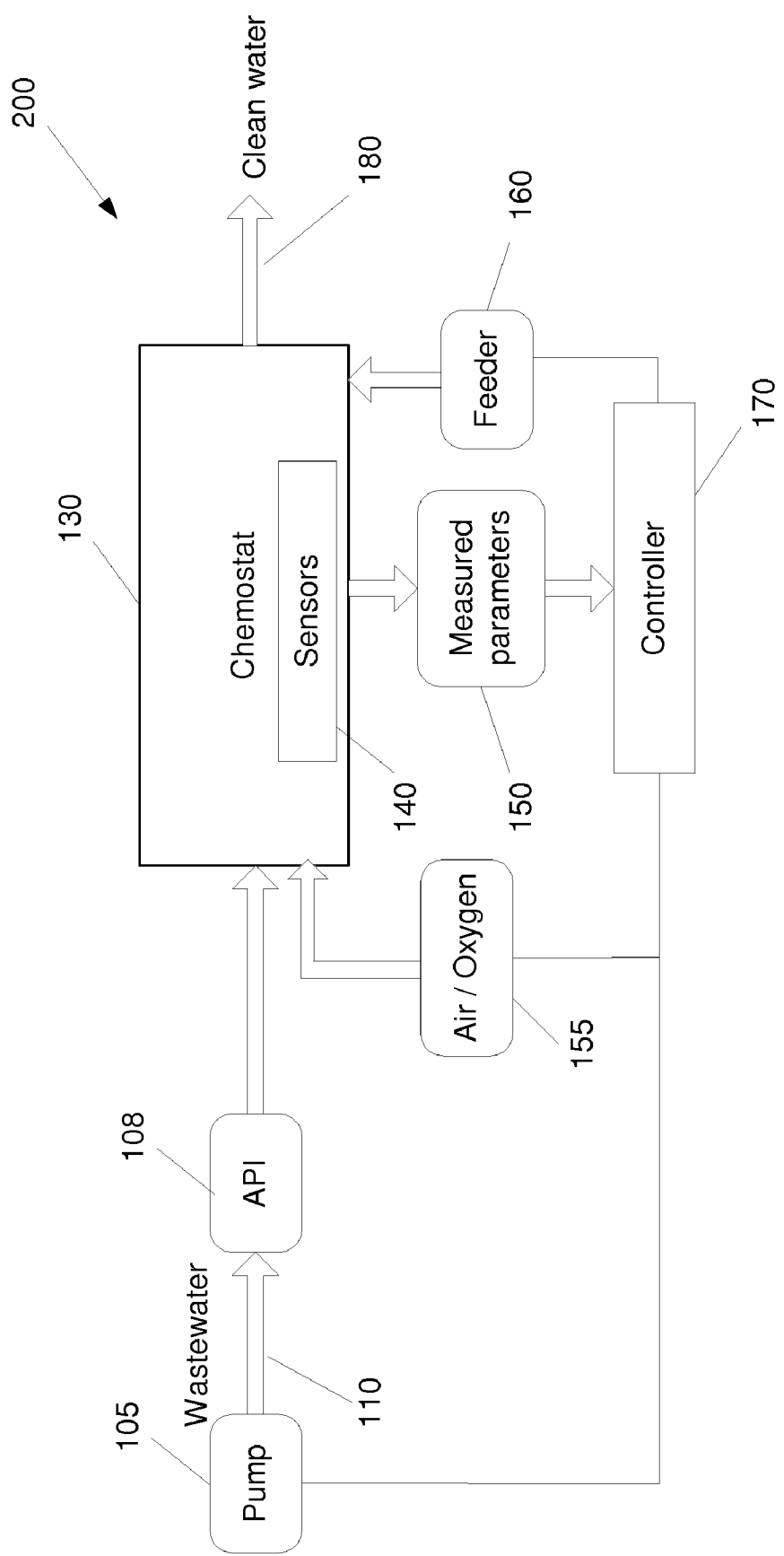
FIG. 7 illustrates an exemplary waste water treatment system according to a second embodiment of the invention.
Figure 8:
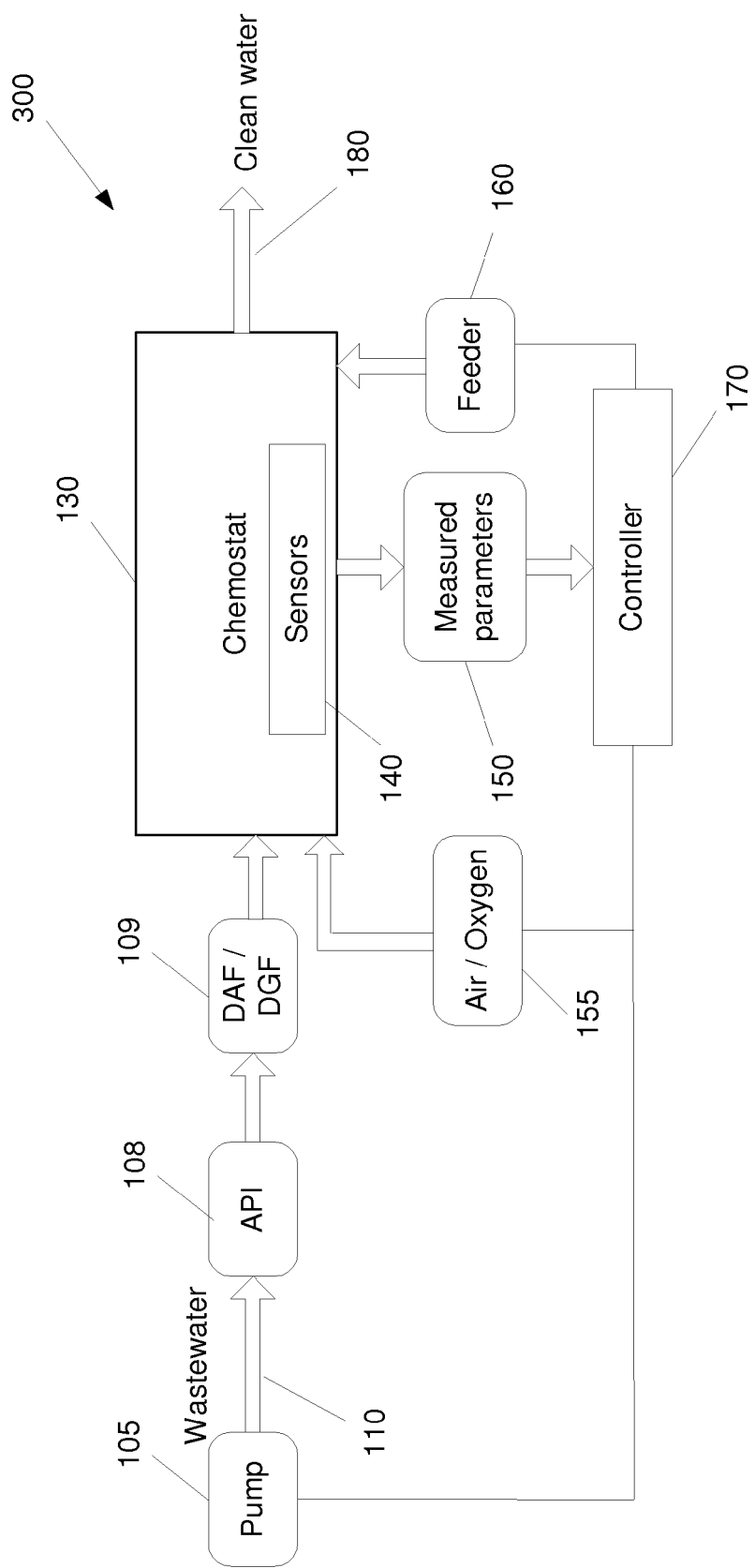
FIG. 8 illustrates an exemplary a wastewater treatment system according to a third embodiment of the invention.

FIG. 7 is a schematic drawing of a wastewater treatment system (200) according to a second embodiment of the invention. System (200) includes, in addition to the components described in conjunction with system (100) of FIG. 6, a gravity separation device (API) (108) for performing a pre-treatment step of oil-water separation. FIG. 8 is a schematic drawing of a wastewater treatment system (300) according to a third embodiment of the invention. System (300) includes, in addition to the components described in conjunction with system (200) of FIG. 7, a chemical/mechanical separation unit using DAF (Dissolved Air Flotation) or DGF (Dissolved Gas Flotation) which involves mixing of chemicals in order to create a flocculation process and then using air to float the flocs. This process separates oil as well as other solids and produces water with small amounts of hydrocarbons.

Figure 9:
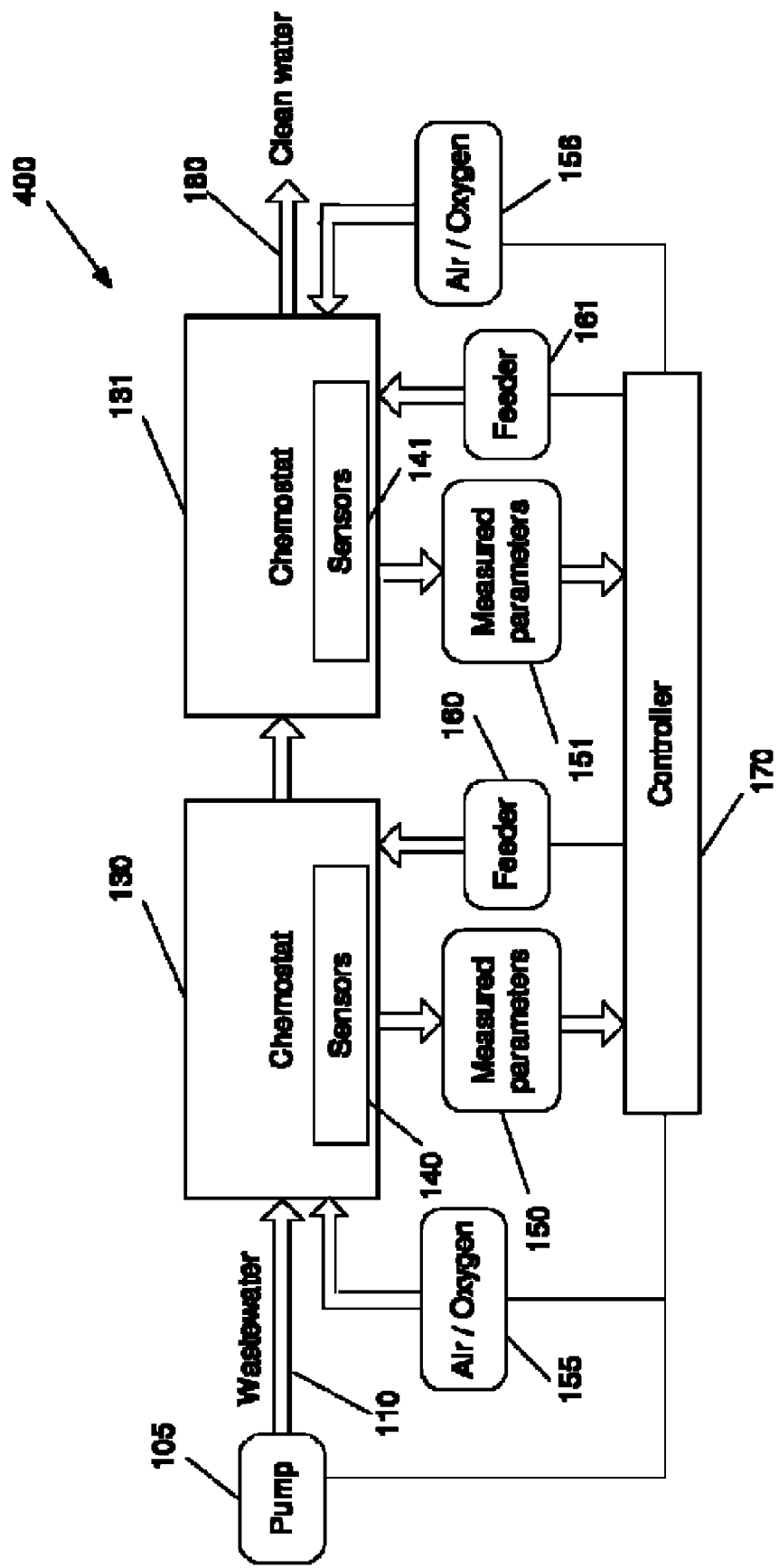
FIG. 9 illustrates an exemplary a wastewater treatment system according to a fourth embodiment of the invention.

FIG. 9 is a schematic drawing of a wastewater treatment system (400) according to a fourth embodiment of the invention. System (400) includes, in addition to the components described in conjunction with system (100) of FIG. 6, a second chemostat (131), downstream of the first chemostat (130). Chemostat (131) similarly includes sensors (141) and is also connected with the controller (170) and to a nutrients feeder (161). The two chemostats (130, 131) may be operated at different flow rates. For example, the first chemostat (130) may be operated at a flow rate of 10%, whereby it holds each drop of wastewater for 10 hours and the second chemostat (131) may be operated at a flow rate of 5%, whereby it holds each drop of wastewater for 20 hours. Alternatively, the two chemostats (130, 131) may be operated at a similar flow rate. The combination of (1) A simple biological process and (2) A tightly controlled automatic process enables the system of the invention to be economic and stable for both small and big water volume. Therefore, the wastewater can always be treated close to where it is created and there is no need to collect and transport it via a network of pipes and pump stations to a municipal treatment plant (as done today in some cases).

Using the chemostat technology in combination with the control system enables simple process and negligible maintenance. While 'Activated Sludge' and 'MBR' are complicated processes, with multiple steps and high maintenance requirements, the process according to the invention is simple and the maintenance requirements are negligible.

Overall cost saving is about 50% of the operating costs and at least $1 per m3. These advantages can be used to justify an upgrade of existing high capacity systems. Since such systems process millions of cubic meters per year, every cent savings per cubic meter treated will result in dramatic operational savings over one year. Additionally the set up cost of the system according to the invention is relatively low (between 1 and three million Dollars, depending on existing infrastructure and capacity Vs. over 10 Million Dollars for similar systems). The calculated ROI (Return On Investment) period may be as short as 18-24 months, compared to the ROI for the MBR and Activated Sludge technologies which is at least 3 times longer because the initial investment is double and the operating costs are 30% higher.

The system according to the invention is advantageous for both small quantities and big quantities facilities.

For the small quantities facilities (e.g. 5-10 m$^3$/hour capacity), the system provides a small footprint, i.e. smaller than 1000 m$^2$, as compared to the Activated Sludge systems which require a footprint approximately 3 times larger. This is achieved by eliminating the DAF pre-treatment and the Clarifier (sludge removal) post-process. The pre-treatment may be eliminated due to the system's ability to bio-degrade wastewater having higher degrees of contamination as compared to prior-art systems. An additional advantage of eliminating the DAF is that it creates "Black Sludge". For small quantities facilities, who cannot economically justify the installation of a bio-degradation system, the system of the invention may be temporarily installed and operated, to replace the existing practice of transporting the wastewater to a cleaning facility.

For large quantities facilities, benefits of the system may include the elimination of the post-processing, sludge removal process and the shortened ROI period. Table 2 below shows results for an oil storage farm operating in Israel for over one year. The farm releases the treated water into sand near the seashore with the full authorization of the EPA. In embodiments, the system may be configured to at least achieve one or more of the discharge requirements or less. Other embodiments may be configured to achieve one or more of the after treatment results.

TABLE 2

Operational results

| Parameter (ppm) | Before Treatment | After Treatment | Discharge Requirements |
|---|---|---|---|
| TPH | 25-75 | 1-2 | 3 |
| COD | N/A | N/A | N/A |
| BOD | 300-1500 | 20-30 | 30 |
| TOC | 400-1000 | 25-50 | 50 |
| TSS | 10-100 | 2-15 | 50 |
| Turbidity | 200-1000 | 2-7 | 30 |
| pH | 7-9 | 7-9 | 6.5-9 |
| Detergents | 1-5 | 1-2 | 3 |
| Sulfide | 50-200 | <0.1 | 0.2 |
| Phenol | 5 | <0.02 | 0.1 |
| PAH | N/A | N/A | N/A |
| Cresol | 1 | <0.02 | 0.15 |
| Benzene | 0.5 | <0.05 | 0.1 |
| Xylene | 0.5 | <0.05 | 0.1 |
| Toluene | 0.5 | <0.05 | 0.15 |

Figure 10:
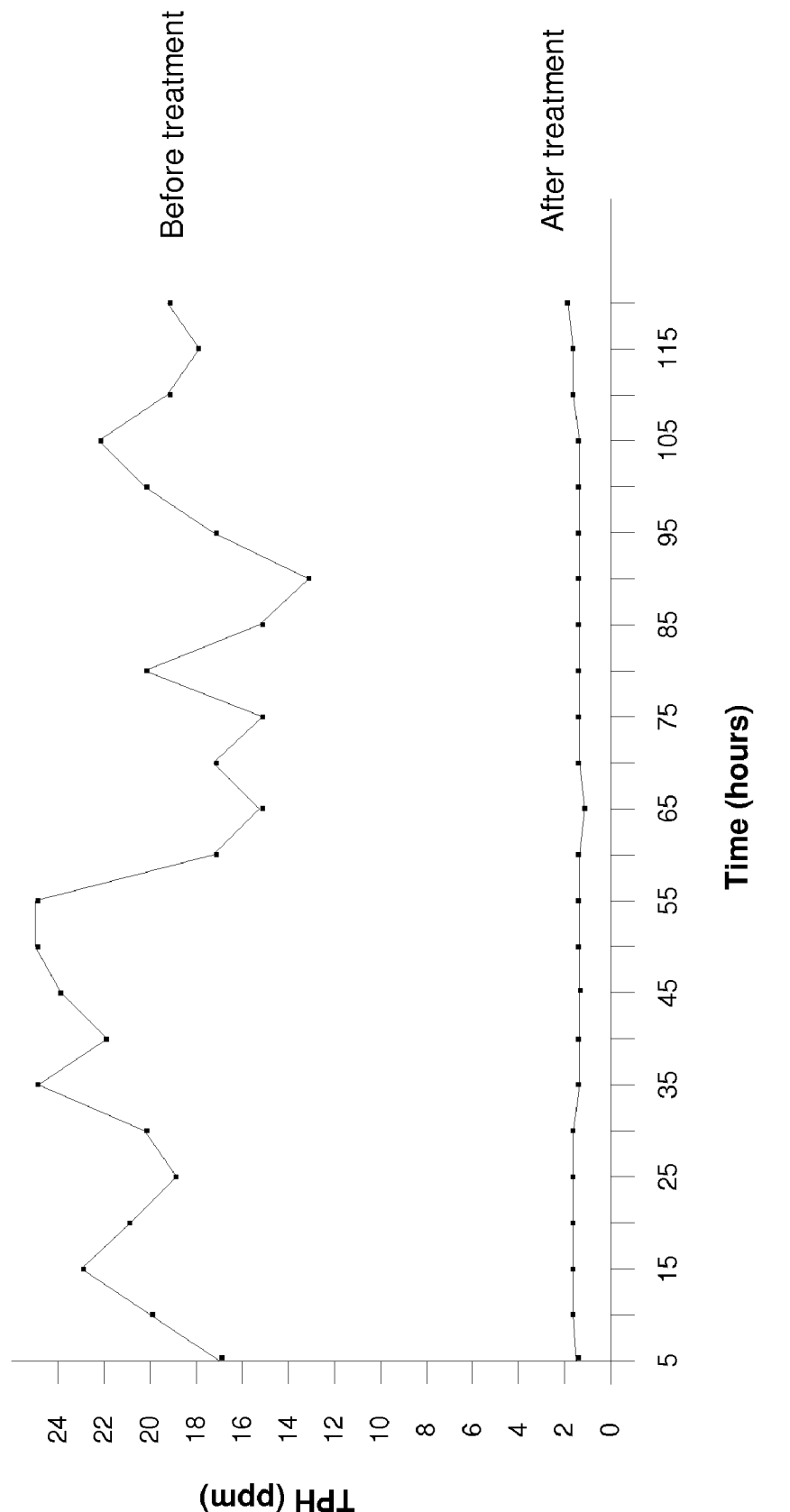
FIG. 10 illustrates an exemplary graph showing TPH flow results at the same site using a waste water treatment system according to the invention.

FIG. 10 is a graph showing TPH flow results at the same site using a system according to the invention with 20% continuous flow.

Figure 11:
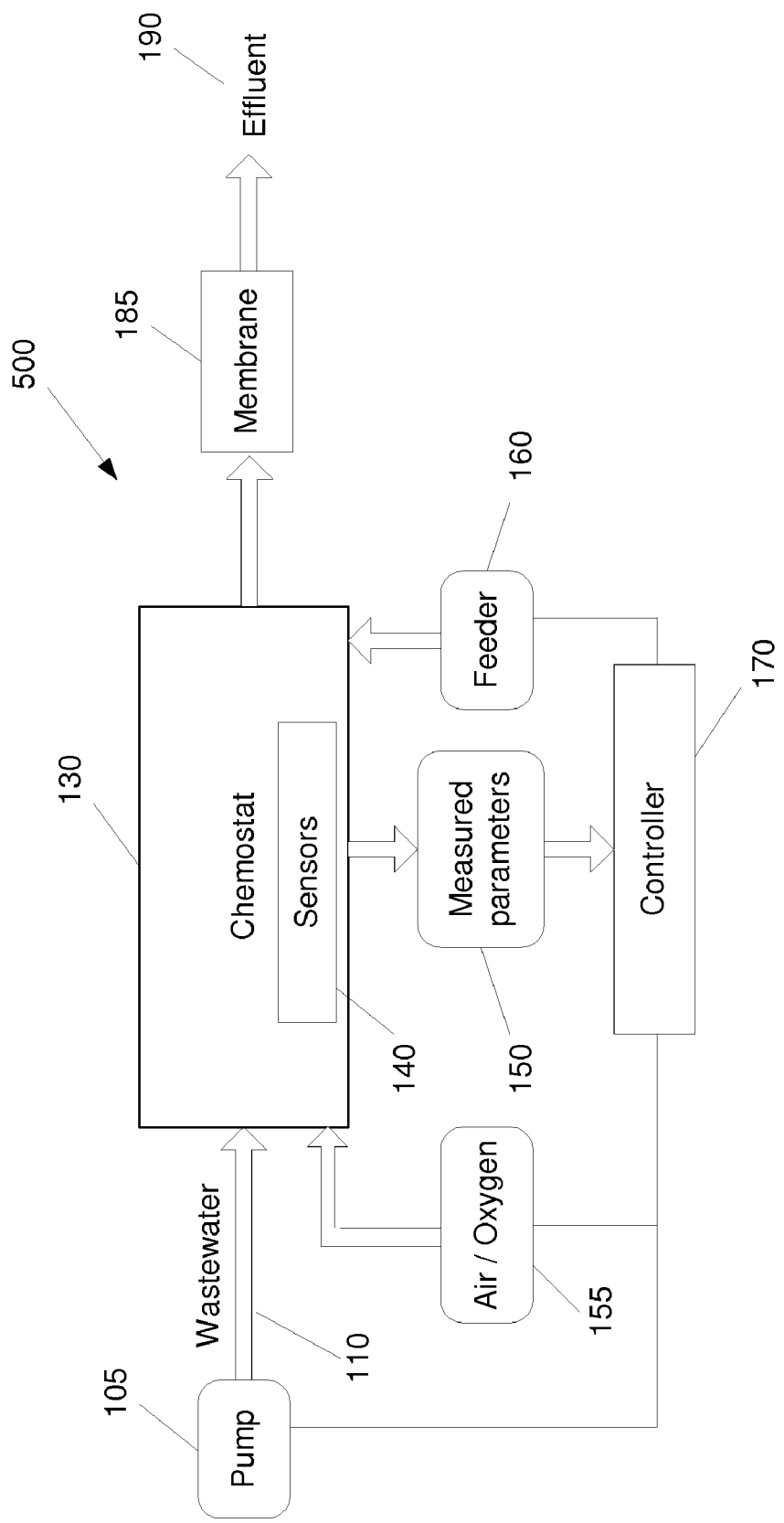
FIG. 11 illustrates an exemplary membrane that may be added to a waste water treatment system comprising a controller for post processing the effluent.

In another embodiment of the invention, as depicted in FIG. 11, a membrane (185) may be added to the system (500) for post processing the effluent, which may be useful in cases where a better effluent quality is required. Alternatively, any other type of post-processing, e.g. settler, sand-filtration, disinfection, or a combination thereof may replace the membrane (185).

Figure 12:
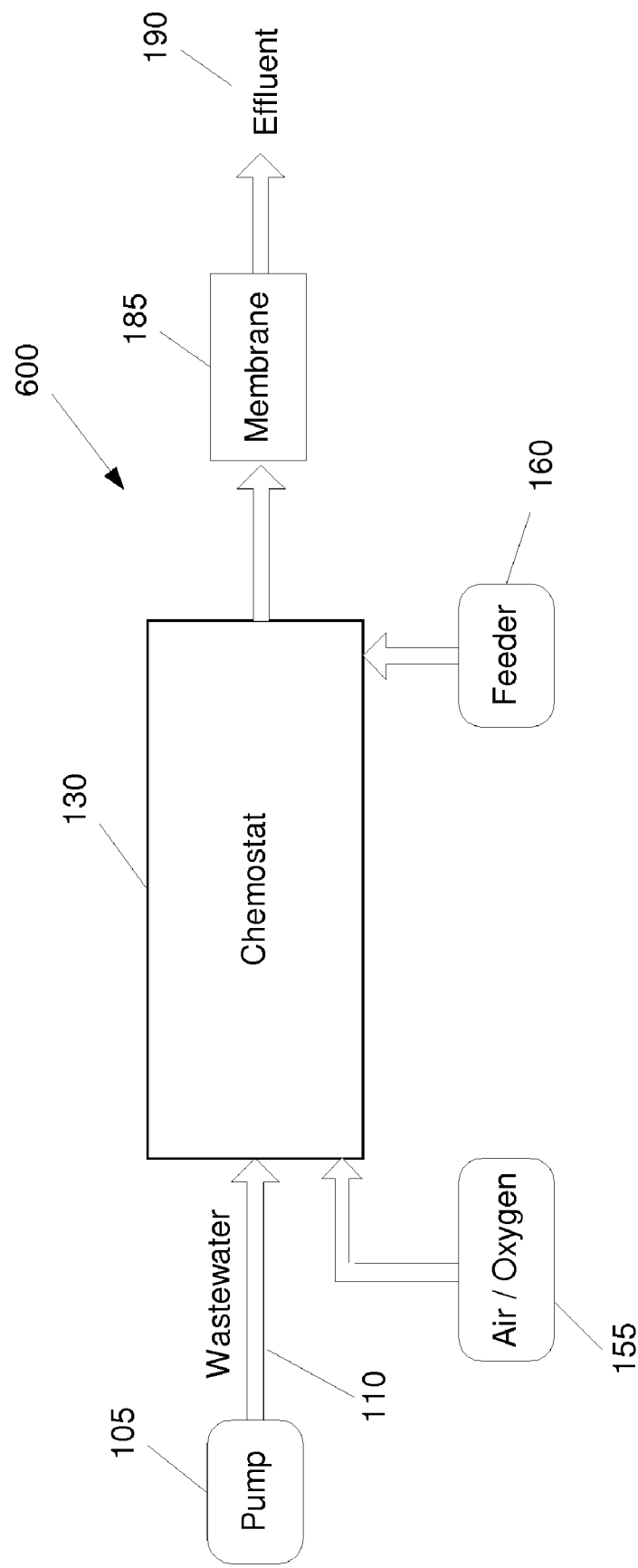
FIG. 12 is illustrates an exemplary membrane that may be added to a waste water treatment system devoid of controller for post processing the effluent

FIG. 12 depicts yet another embodiment of the invention. System (600) according to this embodiment is devoid of controller. The chemostat (130) operates in continuous flow mode, as explained above, maintaining low bacterium concentration. This embodiment may be especially attractive to facilities having stable inflow. However, if small peaks in the influent composition occur (e.g. carbon, ammonia, temperature), they may be handled by the membrane (185). Alternatively, any other type of post-processing, e.g. settler, sand-fixation, disinfection, or a combination thereof may replace the membrane (185).

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A wastewater treatment system comprising:
   a continuous flow chemostat comprising wastewater input, clean water output, bacteria input, nutrients input, oxygen input and one or more sensors configured to measure one or more ambient parameters,
   an electronic controller associated with the one or more sensors, the controller configured to receive measurements from the one or more sensors and control operating conditions of the chemostat, wherein the electronic controller is configured to maintain a sufficiently low concentration of bacteria within the chemostat to be discharged to the nature without further treatment; and
   an automatic starting system configured to start system operation.

2. The system of claim 1, wherein the controller is configured to control at least one of the waste water input, the nutrients input, and the oxygen input.

3. The system of claim 1, wherein no sludge is recycled in the system.

4. The system of claim 1, wherein the controller is configured to adjust carbon concentration to the carbon degradation potential of the bacteria.

5. The system of claim 1, wherein the one or more ambient parameters are selected from the group consisting of: flow rate, (Dissolved Oxygen) DO, (Oxygen Uptake Rate) OUR, pH, temperature, nutrients, contamination level, turbidity and conductivity.

6. The system of claim 1, wherein retention time of the bacteria in the chemostat is not greater than 50 hours.

7. The system of claim 1, comprising an alert.

8. The system of claim 1, wherein the automatic starting system is configured to restart a system operation.

9. The system of claim 1, wherein the automatic starting system is configured to build a first biomass in the chemostat and operate the chemostat in a continuous flow mode following the building of the first biomass.

10. The system of claim 1, wherein the system is configured to test water discharged from clean water output.

11. The system of claim 1, comprising a gravity separation device between the wastewater input and the chemostat, configured to perform a pre-treatment step of oil-water separation.

12. The system of claim 1, comprising a chemical/mechanical separation unit between the wastewater input and the chemostat.

* * * * *